United States Patent [19]
Pepper

[11] 3,989,283
[45] Nov. 2, 1976

[54] COMPRESSION FITTING

[75] Inventor: Kenneth V. Pepper, Davison, Mich.

[73] Assignee: Genova, Inc., Davison, Mich.

[22] Filed: July 23, 1975

[21] Appl. No.: 598,432

[52] U.S. Cl. .............................. 285/323; 285/348; 285/423
[51] Int. Cl.² .......................................... F16L 21/06
[58] Field of Search ................ 285/322, 323, 382.7, 285/354, 348, 423, 38, 39

[56] References Cited
UNITED STATES PATENTS

| | | | |
|---|---|---|---|
| 2,452,277 | 10/1948 | Woodling | 285/382.7 X |
| 2,452,278 | 10/1948 | Woodling | 285/382.7 X |
| 2,522,785 | 9/1950 | Hanson | 285/382.7 X |

FOREIGN PATENTS OR APPLICATIONS

| | | | |
|---|---|---|---|
| 1,166,054 | 6/1958 | France | 285/382.7 |

OTHER PUBLICATIONS

*Pipeline and Gas Journal*, Aug. 1971, pp. 52–54.

*Primary Examiner*—Dave W. Arola
*Attorney, Agent, or Firm*—Olsen and Stephenson

[57] ABSTRACT

Apparatus for connecting a flexible pipe made of material such as polybutylene to a rigid component of a piping system made of metal or rigid thermoplastic material such as chlorinated polyvinylchloride. The apparatus comprises a compression fitting to which the rigid material can be connected, such as by a threaded connection, solvent weld or the like, and to which the flexible pipe can be connected by a compression joint which will provide a tight seal without cutting, abrading or otherwise causing damage to the flexible pipe.

2 Claims, 5 Drawing Figures

COMPRESSION FITTING

BACKGROUND OF THE INVENTION

The present invention relates to improvements in compression fittings especially adapted for use in the joining of thermoplastic pipe and fittings. In particular the invention relates to compression fittings for use with flexible thermoplastic pipe which is to be connected to rigid components of a piping system.

Recent years have seen the development to commercial production levels of thermoplastic materials having favorable heat distortion characteristics and resistance to chemical attack by water. Their properties have been such as to make them suitable in pipe and fitting form for application to hot and cold water supply in residential construction and to various uses in the food and chemical industries.

Certain of these thermoplastics are capable of being joined by solvent welding, that is, by the chemical action of solvents at the interface of pipes and fittings. In this category are such materials as chlorinated polyvinylchloride, or CPVC, and poly-phenylene oxide, or PPO. Other favorable high heat distortion thermoplastics such as polybutylene and cross linked polyethylene cannot readily be attacked by the chemical action of solvents, and so they are joined by mechanical means.

The high heat distortion thermoplastics that are capable of being joined by solvent welding are relatively rigid materials. On the other hand, those that necessitate joining by mechanical means are relatively flexible.

Special problems arise in joining the flexible materials to the rigid materials, although both are thermoplastics. This is also true of joining the flexible thermoplastics to other rigid materials such as copper and iron. The problems are particularly aggravated when elevated temperatures of operation are involved, and are also a matter of concern at lower temperatures. Whereas CPVC is relatively hard, and resists cutting by sharp edges, polybutylene can be cut with a knife when cold, and as it is elevated in temperature it becomes progressively more flexible and easy to cut. The problem then is to secure the polybutylene pipe against end stress, to get a grip on it sufficiently to retain it in the fitting, up to at least the fail point of the pipe itself.

Efforts have been made to use compression fitting for thermo-plastic pipe, but none of these have proved to be a satisfactory solution to the problems set forth above, because of their tendencies to cut or abrade the flexible pipe, lack of holding capability, inadequate sealing capacity, or the like. A pipe coupling such as is disclosed in U.S. Pat. No. 3,563,575, issued Feb. 16, 1971 to Sanford discloses a pipe coupling which would be unsuitable for the desired purpose, because the pipe coupling would not provide adequate holding to overcome end stress or to assure a leak proof joint. A pipe connector or tube coupling such as are disclosed in U.S. Pat. Nos. 3,312,483, and 3,312,484, issued Apr. 4, 1967 to Leadbetter, et al., and Davenport, respectively, show arrangements which are objectionable because the flexible pipe is subject to cutting or abrading action by the connector or coupling.

SUMMARY OF THE INVENTION

The present invention has overcome the inadequacies of the prior art and provides a compression fitting especially adapted for joining flexible thermoplastic pipe with a rigid component of a piping system. The improved compression fitting is constructed and arranged so that it provides an effective seal, that grips the flexible pipe without abrading or cutting it, and that grips it sufficiently to retain it in the fitting up to at least a failing point of the pipe itself.

According to one form of the present invention, a compression fitting is provided for connecting a flexible pipe to a rigid component of a piping system which comprises a body member having a through bore and which is adapted to be secured at one end to the rigid component. The bore of the body member has a shoulder adjacent to one end of the body member so that the flexible pipe can be inserted therein in a sliding-fit relation and have its end seated on the shoulder. The bore is recessed at its other end, and an elastomeric seal ring is in the recessed portion of the bore. A compression ring which has an annular portion that is seated on one end of the body member also has a sleeve portion extending from the annular portion into the recessed portion of the bore into engagement with the seal ring for compressing and urging the latter into sealing engagement with the body member and the flexible pipe. A conical-shaped clamp ring is provided which has a base portion seated on the compression ring, the clamp ring having resilient properties and being split longitudinally to provide a slit when in an unstressed position and having a through bore of cylindrical shape when the clamp ring is urged together to close the slit. The through bore of the split ring also defines a V-shaped radially inward projection around its inner periphery for penetration into the flexible tube. A compression nut is provided which has a through bore defining at one end a conical configuration corresponding to the outer configuration of the clamp ring when the latter is closed, the other end of the compression nut being threadedly connected to the body member so that the conical configuration of the compression nut retains the clamp ring in its closed position when the compression nut is fully advanced on the body member. The compression nut has an internal stop means or shoulder which engages the compression ring so that the compression nut bottoms out at the same time that the compression ring closes, thereby preventing any further compressive force from being applied to the compression ring. Thus, the V-shaped projection will penetrate the flexible pipe wall an amount sufficient to provide the desired holding action against end stress and there will be no danger that the installer will damage the flexible pipe during installation.

Thus, it is an object of the present invention to provide an improved compression fitting for use in joining flexible and rigid components of a piping system.

Other objects of this invention will appear in the following description and appended claims, reference being had to the accompanying drawing forming a part of this specification wherein like reference characters designate corresponding parts in the several views.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
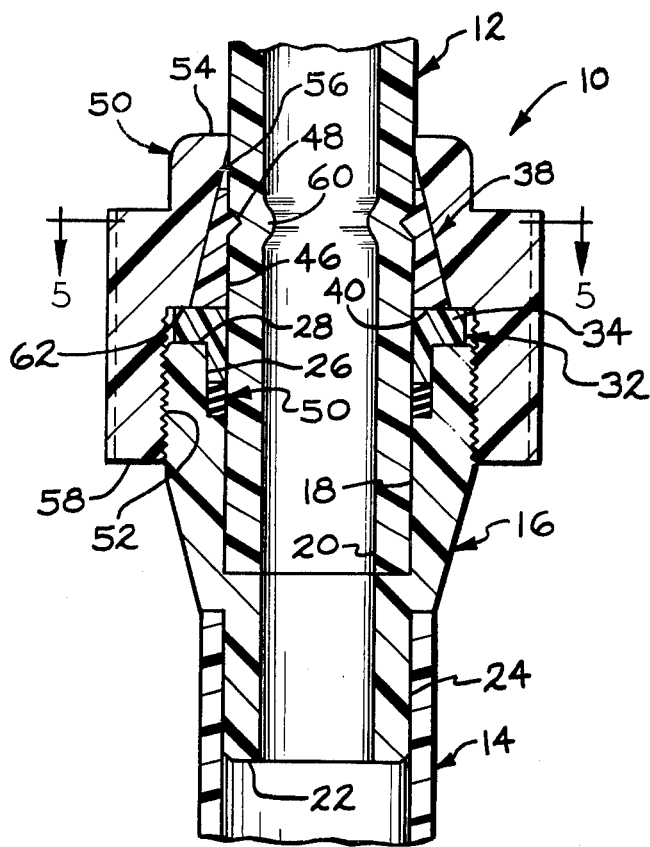
FIG. 1 is a longitudinal section through a compression fitting embodying the present invention, showing the fitting joining a flexible pipe to a rigid pipe.
Figure 3:
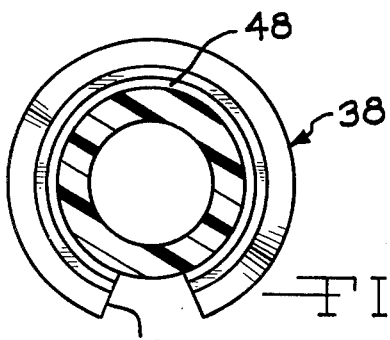
FIG. 3 is an enlarged section taken on the lines 3—3 of FIG. 2.
Figure 4:
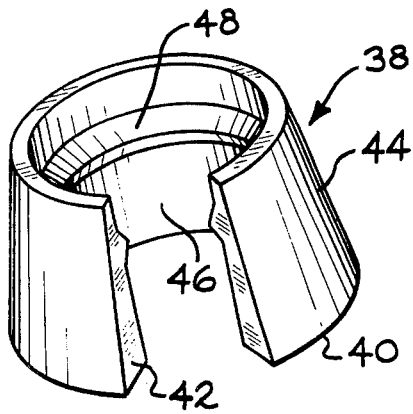
FIG. 4 is a perspective view of the conical-shaped clamp ring of the illustrated embodiment.

Referring now to the drawing, the invention will be described in greater detail. The compression fitting 10 is shown in FIG. 1 connecting the flexible pipe 12 to a rigid pipe 14. While the rigid pipe 14 is shown connected to the compression fitting 10, is to be understood that any other rigid component of a piping system, such as pipe fittings, valves, or the like may be connected to the pipe fitting in place of the rigid pipe 14.

The compression fitting 10 has a body member 16 which has a through bore 18 with a shoulder 20 located adjacent to the one end 22 of the body member. The shoulder 20 is provided as a seat for the end of the flexible pipe 12 which can be inserted in a sliding fit relation into the bore 18. Preferably, the bore 18 from the shoulder 20 to the one end 22 is of the same internal diameter as the flexible pipe 12 so as to provide a continuous flow passage. The body member 16 has an end portion 24 to which the rigid pipe 14 is connected by conventional solvent welding. Other suitable means can be provided at the end of the body member 12 for connecting a rigid component, such as by use of threaded connections or the like. The body member 16 has its bore 18 recessed at 26 at its other end 28. Located within the recessed portion 26 is the elastomeric seal ring 30.

Figure 2:
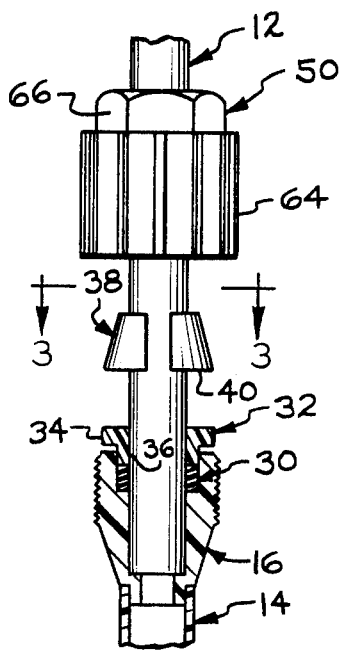
FIG. 2 is an elevational view, partly in section, showing the components of the compression fitting during one stage of installation.

A compression ring 32 is provided which has an annular portion 34 adapted to seat on said other end of the body member 16, and it has a sleeve portion 36 extending from the annular portion 34 into the recessed portion 26 of the bore 18 into engagement with the elastomeric seal ring 30. In the unstressed condition of the elastomeric seal ring 30, the compression ring 32 will be slightly spaced from the end of the body member 16, as shown in FIG. 2, and when the compression ring 32 is moved into seating engagement with the end 28, the sleeve portion 36 will compress the elastomeric seal ring 30 so that it maintains a tight sealing engagement with respect to the body member 16 and the flexible pipe 12.

Figure 5:
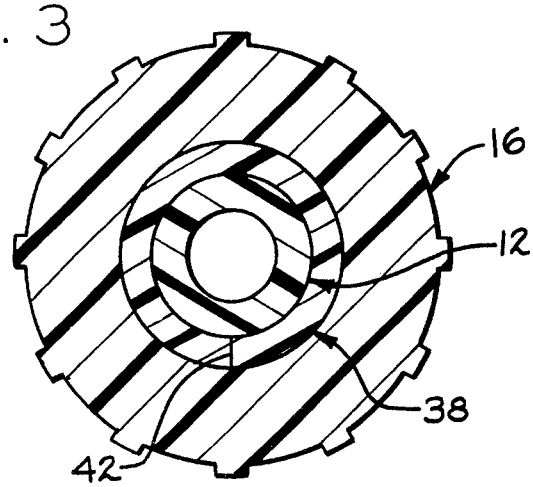
FIG. 5 is a sectional view taken on the lines 5—5 of FIG. 1.

A conical-shaped clamp ring 38 is provided which has a base portion 40 for seating on the compression ring 32 to urge the latter into seating engagement with the end 28 of body member 16. The clamp ring 38 is split longitudinally to provide a spaced-open slit 42 when in its unstressed condition, and the clamp ring 38 has resilient properties so that the slit 42 can be urged together to a closed position as shown in FIGS. 1 and 5. The outer surface 44 of the clamp ring 38 is a truncated segment of a cone, and the through bore 46 or interior of the clamp ring 38 defines a cylindrical surface, when the slit 42 is closed. The through bore 46 of the clamp ring 38 also defines a V-shaped radially inward projection 48 for penetration into the flexible tube 12, as shown in FIG. 1, when the clamp ring 38 is closed.

A compression nut 50 which has a through bore 52 is provided which defines at its one end 54 a conical configuration 56 corresponding to the outer configuration of the clamp ring 38 when the latter is closed. The compression nut is threadedly connected to the body member 16 at the other end 58 so that when the compression nut 50 is threadedly advanced onto the body member 16, the conical configuration 56 will engage the outer surface of the conical-shaped clamp ring 38 initially to advance the compression ring 32 into seating engagement with the body member 16, and thereafter, the conical-shaped clamp ring 38 will close around the flexible pipe 12 so that the V-shaped radially inward projection 48 will penetrate the flexible pipe 12 as shown at 60.

The through bore of the compression nut 50 also includes the shoulder or stop means 62 which is adapted to seat on the compression ring 32 at the same time that the slit 42 is closed in response to the threaded advance of the compression nut 50 on the body member 16. Thus, assurance is provided that the compression nut 50 will be screwed onto the body member 16 precisely in correct amount to assure proper sealing and holding action on the part of the internal components of the compression fitting. For the purpose of screwing the compression nut onto the body member 16 hand gripped ribs 64 may be provided, and also flat faces 66 are provided for receiving a conventional wrench.

It is claimed:

1. In combination, a flexible thermoplastics pipe and a compression fitting secured thereto and adapted to be connected to a rigid component of a piping system, said compression fitting comprising a body member having a through bore and adapted to be secured to said rigid component, said bore having a shoulder adjacent to one end of said body member, said flexible pipe being in a sliding-fit relation within said bore and having its end seated on said shoulder, said bore of said body member having a diameter at said one end equal to the inner diameter of said shoulder and equal to the inner diameter of said flexible pipe, said bore being recessed at its other end, an elastomeric seal ring in said recessed portion of the bore, a compression ring having an annular portion seated on said one end of the body member and a sleeve portion extending from said annular portion into said recessed portion into engagement with said seal ring to urge the latter into sealing engagement with said bore and flexible pipe, a conical-shaped clamp ring having a base portion seated on said compression ring, said clamp ring having resilient properties and being split longitudinally to provide a slit when in an unstressed condition and having a through bore of cylindrical shape when said clamp ring is urged together to close the slit, the through bore of the closed clamp ring having essentially the same diameter as the outer diameter of said flexible pipe, said through bore of the split ring also defining an axially symmetrical V-shaped radially inward projection around its inner periphery penetrating into said flexible pipe without cutting or causing damage to said flexible pipe, and a compression nut having a through bore defining a conical configuration corresponding to the outer configuration of said clamp ring when the latter is closed, the bore at the one end of said compression nut having a diameter conforming essentially to that of said flexible tube, the other end of said compression nut being threadedly connected to said body member so that the conical configuration of said compression nut retains said clamp ring in its closed position around said flexible tube, the bore in said compression nut also defining a shoulder that is seated on said compression ring so as to limit axial movement of the portion of the bore defining said conical configuration to a position wherein the conical configuration has closed said slit in said clamp ring.

2. A compression fitting for connecting a flexible pipe to a rigid component of a piping system, said compression fitting comprising a body member having a through bore and adapted to be secured at one end to said rigid component, said bore having a shoulder adjacent to said one end of said body member so that said flexible pipe can be inserted in a sliding-fit relation within said bore and having its end seated on said shoulder, said bore being recessed at its other end, an elastomeric seal ring in said recessed portion of the bore, a compressing ring having an annular portion seated on said one end of the body member and a sleeve portion extending from said annular portion into said recessed portion into engagement with said seal ring for urging the latter into sealing engagement with said bore and the flexible pipe that may be inserted in the body member, a conical-shaped clamp ring having a base portion seated on said compression ring, said clamp ring having resilient properties and being split longitudinally to provide a slit when in an unstressed condition and having a through bore of cylindrical shape when said clamp ring is urged together to close the slit, said through bore of the clamp ring also defining an axially symmetrically V-shaped radially inward projection around its inner periphery for penetration into a flexible pipe without cutting or causing damage to said flexible pipe, and a compression nut having a through bore defining at one end of the compression nut a conical configuration corresponding to the outer configuration of said clamp ring when the latter is closed, the other end of said compression nut being threadedly connected to said body member so that the conical configuration of said compression nut retains said clamp ring in its closed position, said conical-shaped clamp ring, when stressed to a closed position by axial movement of the compression nut relative to said body member, having a diameter of its bore corresponding to the outer diameter of the flexible pipe adapted to be inserted therein, and when in an unstressed condition having internal clearance within said V-shaped inward projection sufficient for passage of a flexible pipe having said outer diameter, said compression nut having a stop portion for limiting the extent that said compression nut can be threadedly advanced on said body member to an amount that is sufficient to close said clamp ring, said stop portion being a shoulder for seating on said compression ring.

* * * * *